4/29/86 OR 4,585,297

United States Patent [19]

Hamaguchi et al.

[11] Patent Number: 4,585,297

[45] Date of Patent: Apr. 29, 1986

[54] LIGHT DEFLECTOR

[75] Inventors: Iwao Hamaguchi, Kanagawa; Isamu Shibata, Tokyo, both of Japan

[73] Assignee: Ricoh Company, Ltd., Japan

[21] Appl. No.: 511,677

[22] Filed: Jul. 7, 1983

[30] Foreign Application Priority Data

Jul. 8, 1982 [JP] Japan ............................ 57-118785

[51] Int. Cl.⁴ ............................ G02B 26/08

[52] U.S. Cl. ............................ 350/6.8

[58] Field of Search ............................ 350/6.8, 3.71, 6.7, 350/6.5; 318/480, 640

[56] References Cited

U.S. PATENT DOCUMENTS

| | | | |
|---|---|---|---|
| 3,940,202 | 2/1976 | Kato et al. | 350/3.71 |
| 4,160,939 | 7/1979 | Damouth et al. | 350/6.8 X |
| 4,213,157 | 7/1980 | DeBenedictis et al. | 350/6.8 X |
| 4,243,294 | 1/1981 | Noguchi | 350/6.8 |

*Primary Examiner*—John K. Corbin
*Assistant Examiner*—Vincent J. Lemmo
*Attorney, Agent, or Firm*—Guy W. Shoup

[57] ABSTRACT

A light deflector for use in a laser printer, for example, is composed of a motor having a drive shaft and a light reflecting member such as a rotating multiple-surface mirror or a hologram. The motor is subjected to magnetic field ripples the number of which is equal to a multiple by an integer of the number of light reflecting surfaces of the light reflecting member.

5 Claims, 6 Drawing Figures 1 2 3 4 5 6 7

FIG. 1
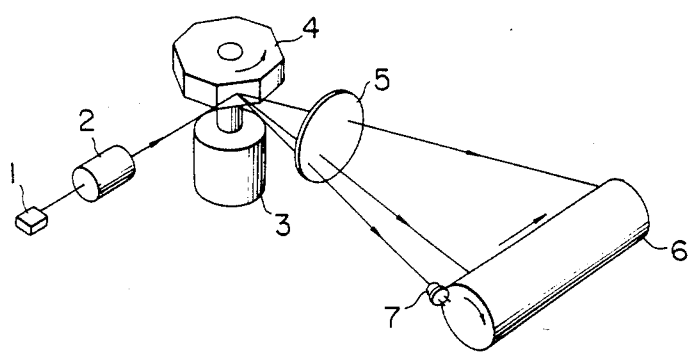
FIG. 2
FIG. 3
FIG. 5
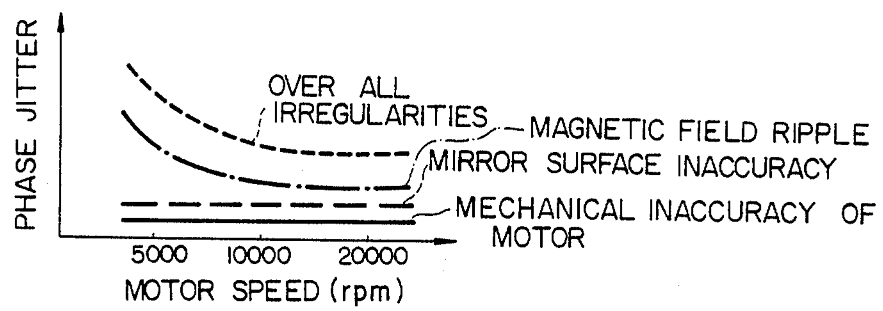
FIG. 4
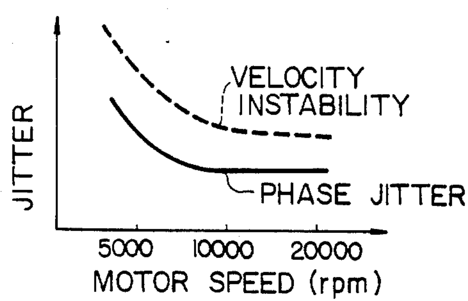
FIG. 6
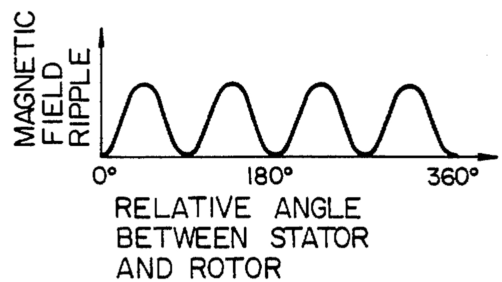

LIGHT DEFLECTOR

BACKGROUND OF THE INVENTION

1. Field of the Invention

The present invention relates to a light deflector such as a rotating multiple-surface mirror or a hologram disk for use in various devices employing a laser beam such as a laser printer, a display, a flaw detector or a POS scanner.

2. Description of the Prior Art

Prior light deflectors such as rotating multiple-surface mirrors have been subjected to various problems that adversely affect optical characteristics of the deflectors. One of such difficulties is caused by jitter due to both a phase jitter resulting in cyclic rotational fluctuations of the motor which rotates the rotating miltiple-surface mirrors and a velocity instability resulting in time-dependent rotational fluctuations of the motor. The phase jitter is disadvantageous in that any line which would have to be drawn by the optical deflector perpendicularly to a main scanning direction or parallel to an auxiliary scanning direction tends to suffer from small vibrations. Any velocity instability, on the other hand, causes such a line to fluctuate in a greater cycle. In any case, these motor fluctuations impair the quality of an image printed or otherwise displayed.

It is known that, in general, as the speed of rotation of the rotating multiple-surface mirror or the motor is reduced, the fluctuations attributable to the phase jitter and the velocity instability are increased. Since the phase jitter and the velocity instability are correlated with each other, any reduction of the phase jitter can result in a reduction in fluctuations caused by the velocity instability.

SUMMARY OF THE INVENTION

It is an object of the present invention to provide a light deflector capable of deflecting a light beam in a manner to produce images of improved quality through a reduction in phase jitter.

According to the present invention, a light deflector comprises a light reflecting member such as a rotating multiple-surface mirror or a hologram disk coupled to the drive shaft of a motor and having a plurality of light reflecting surfaces for successively reflecting an incident light beam in response to rotation of the drive shaft, the motor being subjected to generated magnetic field ripples the number of which is a multiple by an integer of the number of the light reflecting surfaces. With the light deflector of the above arrangement, magnetic field ripples which are chiefly responsible for phase jitter can be cancelled out by being equalized in their frequency to the a multiple by an integer of the number of reflecting surfaces of the light reflecting member, so that the phase jitter and any fluctuations due to a velocity instability of the motor can simultaneously be reduced. The light deflector can effectively suppress unwanted jitter or fluctuations which would be increased and impair the quality of reproduced images particularly at a motor speed of 10,000 rpm or below.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic perspective view of a laser printer in which the principles of the present invention are incorporated;

FIG. 2 is a view showing a line image subjected to vibrations due to phase jitter;

FIG. 3 is a view illustrative of a line image suffering from fluctuations due to velocity instability;

FIG. 4 is a graph showing the relationship between the motor speed and jitter caused by a phase jitter and a velocity instability;

FIG. 5 is a graph illustrating the relationship between the motor speed and phase jitter resulting from various irregularities; and FIG. 6 is a graph showing a magnetic field ripple plotted against the relative angle between the stator and rotor of a motor.

DETAILED DESCRIPTION

The present invention is particularly useful when embodied in a laser printer having a rotating multiple-surface mirror as shown in FIG. 1. The laser printer comprises a light source 1 such as a semiconductor laser for emitting a laser beam, and a coupling lens 2 in the form of a compound lens for directing a parallel laser beam toward a rotating multiple-surface mirror 4 rotated by a motor 3 coupled therewith. The laser printer also has an f lens 5 for focusing the laser beam as deflected by the rotating multiple-surface mirror 4 onto a photosensitive drum 6 as a scanning spot thereon. The laser beam emitted from the semiconductor laser 1 is modulated with a signal to be recorded or printed. Main scanning is effected axially of the photosensitive drum 6 by the rotation of the rotating multiple-surface mirror 4, and auxiliary scanning is effected in a direction normal to the axis of the photosensitive drum 6 by the rotation of the latter. The photosensitive drum 6 has its cylindrical surface charged uniformly in advance at a prescribed polarity. The charged cylindrical drum surface is selectively hit and discharged by the scanning beam spot to form an electrostatic latent image in a pattern equal to an image to be printed. Colored minute particles, known as "toner", are then electrostatically applied to the cylindrical drum surface, thereby developing or visualizing the image, which is transferred to an image carrier such as a sheet of paper and then fixed thereto. The scanning beam is detected by a light detector 7 positioned in the vicinity of a point where each main scanning line starts for thereby synchronizing the main scanning with the signal to be recorded.

The rotating multiple-surface mirror 4 is liable to undergo various problems that adversely affect optical characteristics of the mirror. One of such difficulties is caused by jitter due to both a phase jitter resulting in cyclic rotational fluctuations of the motor 3 and a velocity instability resulting in time-dependent rotational fluctuations of the motor 3. The phase jitter is disadvantageous in that any line which would have to be drawn by the mirror 4 perpendicularly to a main scanning direction or parallel to an auxiliary scanning direction tends to suffer from small vibrations as shown in FIG. 2. Any velocity instability, on the other hand, causes such a line to fluctuate in a greater cycle as illustrated in FIG. 3. In any case, these motor fluctuations impair the quality of an image printed or otherwise displayed.

It is known that, in general, as the speed of rotation of the rotating multiple-surface mirror 4 or the motor 3 is reduced, the fluctuations attributable to the phase jitter and the velocity instability are increased, as shown in FIG. 4. The phase jitter and the velocity instability have the following relationship:

$$\text{Velocity instability} \simeq \text{Phase jitter} + k \quad (1)$$

where k is a constant, and thus any reduction of the phase jitter can result in a reduction in fluctuations caused by the velocity instability.

The phase jitter is considered to be caused by various irregularities associated with the rotating multiple-surface mirror 4 and the motor 3. These irregularities include a mirror surface inaccuracy of the rotating multiple-surface mirror 4, a magnetic field ripple in the motor 3, and a mechanical inaccuracy of the motor 3.

The foregoing irregularities affect the phase jitter as shown in FIG. 5. More specifically, the magnetic field ripple in the motor 3 has a greatest adverse effect on the phase jitter, and the surface inaccuracy of the mirror 4 and the mechanical inaccuracy of the motor 3 are less conducive to the phase jitter.

The magnetic field ripple in the motor 3 is correlated to the number of stator poles and the number of phases of the motor 3. For example, a two-pole two-phase motor is subjected to magnetic field ripples which appear four times while the rotor and stator make a single relative revolution, as shown in FIG. 6. This indicates that the frequency of magnetic field ripples produced during one revolution of the motor 3 is given by the following equation:

$$\text{Frequency of magnetic field ripples} = \text{the number of stator poles} \times \text{the number of phases} \quad (2)$$

From the foregoing analysis, it is concluded that where the frequency of magnetic field ripples is equalized to a multiple by an integral number of the number of reflecting surfaces of the rotating multiple-surface mirror 4, the magnetic field ripples can be cancelled out by rotation of the mirror 4, resulting in a reduction in the phase jitter. With two-pole four-phase motors, four-pole two-phase motors, and four-pole four-phase motors, for example, the number of reflecting surfaces of the mirror 4 is selected to be eight. The number of reflecting surfaces of the mirror 4 is selected to be twelve for four-pole three-phase motors, eight-pole three-phase motors, six-pole two phase motors, and six-pole four-phase motors, for example. Such a relationship is effective for both AC synchronous motors and DC motors.

Although a certain preferred embodiment has been shown and described, it should be understood that many changes and modifications may be made therein without departing from the scope of the appended claims. For example, the present invention is applicable to other types of light deflectors, such as a hologram disk having a plurality of holograms serving as reflecting surfaces.

What is claimed is:

1. A light deflector comprising a motor having a drive shaft and a light reflecting member coupled to said drive shaft and having a plurality of light reflecting surfaces for successively reflecting an incident light beam in response to rotation of said drive shaft, said motor being subjected to generated magnetic field ripples per revolution the number of which is arranged to be equal to a multiple by an integer of the number of said light reflecting surfaces.

2. A light deflector according to claim 1, wherein said light reflecting member comprises a rotating multiple-surface mirror.

3. A light deflector according to claim 1, wherein said light reflecting member comprises a hologram disk having holograms serving as said light reflecting surfaces.

4. A light deflector according to claim 1, wherein motor comprises an AC synchronous motor.

5. A light deflector according to claim 1, wherein motor comprises a DC motor.

* * * * *